(12) United States Patent
Seidel et al.

(10) Patent No.: US 9,288,553 B2
(45) Date of Patent: *Mar. 15, 2016

(54) APPLICATION GADGETS AND ELECTRONIC PROGRAM GUIDES

(71) Applicant: Microsoft Corporation, Redmond, WA (US)

(72) Inventors: Joseph J. Seidel, Menlo Park, CA (US); Nadav M. Neufeld, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/572,623

(22) Filed: Dec. 16, 2014

(65) Prior Publication Data
US 2015/0106848 A1    Apr. 16, 2015

Related U.S. Application Data

(63) Continuation of application No. 13/190,276, filed on Jul. 25, 2011, now Pat. No. 8,925,031, which is a continuation of application No. 12/060,847, filed on Apr. 1, 2008, now Pat. No. 8,032,918.

(51) Int. Cl.
*H04N 7/16* (2011.01)
*H04N 7/173* (2011.01)
*H04N 21/81* (2011.01)
*G06F 3/0481* (2013.01)
*H04N 5/44* (2011.01)
(Continued)

(52) U.S. Cl.
CPC ........ *H04N 21/8173* (2013.01); *G06F 3/04817* (2013.01); *H04N 5/4403* (2013.01); *H04N 21/4227* (2013.01); *H04N 21/42209* (2013.01); *H04N 21/4431* (2013.01); *H04N 21/4722* (2013.01); *H04N 21/4782* (2013.01); *H04N 21/47217* (2013.01); *H04N 21/482* (2013.01); *H04N 21/4852* (2013.01); *H04N 2005/441* (2013.01)

(58) Field of Classification Search
CPC . H04N 7/17318; H04N 5/4401; H04N 7/163; H04N 5/50; H04N 21/4126; H04N 7/173
USPC .......... 725/114, 139, 141, 151, 153, 131, 133
See application file for complete search history.

(56) References Cited

U.S. PATENT DOCUMENTS

| | | |
|---|---|---|
| 5,327,529 A | 7/1994 | Fults et al. |
| 6,104,334 A | 8/2000 | Allport |

(Continued)

OTHER PUBLICATIONS

"Advisory Action", U.S. Appl. No. 12/060,847, filed Apr. 21, 2011, 3 pages.

(Continued)

*Primary Examiner* — Sumaiya A Chowdhury
(74) *Attorney, Agent, or Firm* — Aaron Chatterjee; Judy Yee; Micky Minhas

(57) ABSTRACT

Application gadget techniques are described. In an implementation, a remote control device includes a display device and one or more modules. The one or more modules are configured to initiate one or more control functions related to control of a display of content by a client. The one or more modules also provide an environment to execute one or more application gadgets such that an output of the one or more application gadgets is displayable on the display device.

20 Claims, 7 Drawing Sheets

(51) Int. Cl.
*H04N 21/4227* (2011.01)
*H04N 21/443* (2011.01)
*H04N 21/422* (2011.01)
*H04N 21/472* (2011.01)
*H04N 21/4722* (2011.01)
*H04N 21/4782* (2011.01)
*H04N 21/482* (2011.01)
*H04N 21/485* (2011.01)

(56) References Cited

U.S. PATENT DOCUMENTS

| | | | |
|---|---|---|---|
| 6,400,996 B1 | 6/2002 | Hoffberg | |
| 7,552,460 B2 | 6/2009 | Goldman | |
| 7,631,267 B2* | 12/2009 | Viji | G06F 9/4443 715/748 |
| 7,917,929 B2* | 3/2011 | Kim | H04N 5/44543 725/58 |
| 8,032,918 B2 | 10/2011 | Seidel | |
| 8,925,031 B2 | 12/2014 | Seidel et al. | |
| 2002/0056112 A1* | 5/2002 | Dureau | H04N 21/8186 725/78 |
| 2002/0162120 A1* | 10/2002 | Mitchell | H04N 7/165 725/135 |
| 2005/0283800 A1* | 12/2005 | Ellis | H04N 5/44543 725/40 |
| 2006/0059516 A1 | 3/2006 | Montvay | |
| 2007/0043839 A1 | 2/2007 | Amadio | |
| 2007/0061724 A1 | 3/2007 | Slothouber et al. | |
| 2007/0124764 A1 | 5/2007 | Morris | |
| 2007/0214488 A1 | 9/2007 | Nguyen et al. | |
| 2007/0226734 A1 | 9/2007 | Lin | |
| 2007/0250863 A1 | 10/2007 | Ferguson | |
| 2007/0288967 A1* | 12/2007 | Candelore | H04N 5/913 725/50 |
| 2008/0243771 A1 | 10/2008 | Prahlad et al. | |
| 2009/0217335 A1 | 8/2009 | Wong et al. | |
| 2009/0249395 A1 | 10/2009 | Seidel | |
| 2011/0283317 A1 | 11/2011 | Seidel | |
| 2011/0283318 A1 | 11/2011 | Seidel | |

OTHER PUBLICATIONS

"Final Office Action", U.S. Appl. No. 12/060,847, filed Mar. 21, 2011, 8 pages.
"Final Office Action", U.S. Appl. No. 13/190,250, filed Apr. 11, 2013, 21 pages.
"Final Office Action", U.S. Appl. No. 13/190,250, filed Sep. 9, 2013, 24 pages.
"Final Office Action", U.S. Appl. No. 13/190,276, filed Feb. 12, 2014, 22 pages.
"Final Office Action", U.S. Appl. No. 13/190,276, filed May 8, 2013, 21 pages.
"Non-Final Office Action", U.S. Appl. No. 12/060,847, filed Sep. 22, 2010, 10 pages.
"Non-Final Office Action", U.S. Appl. No. 13/190,250, filed Jan. 15, 2014, 27 pages.
"Non-Final Office Action", U.S. Appl. No. 13/190,250, filed Dec. 31, 2012, 23 pages.
"Non-Final Office Action", U.S. Appl. No. 13/190,250, filed Jun. 26, 2013, 24 pages.
"Non-Final Office Action", U.S. Appl. No. 13/190,276, filed Sep. 5, 2013, 19 pages.
"Non-Final Office Action", U.S. Appl. No. 13/190,276, filed Dec. 18, 2012, 25 pages.
"Notice of Allowance", U.S. Appl. No. 12/060,847, filed Jun. 28, 2011, 8 pages.
"Notice of Allowance", U.S. Appl. No. 13/190,276, Aug. 20, 2014, 6 pages.
"VITO Remote", http://vitotechnology.com/en/products/remote.html.
Aibeck, "Google Desktop—Loaded Search Tool for Your PC and More", Retrieved from: <http://www.makeuseof.com/tag/google-desktop/> on Dec. 21, 2007, Oct. 30, 2006, 8 pages.
Guzman, et al.,' "4 Great Gadgets That Set Your TV Free", Retrieved from: <http://www.nypost.com/seven/01212007/entertainment/4_great_gadgets_that_set_your_tv_free_entertainment_isaac_guzman_and_maxine_shen.htm> on Dec. 21, 2007, Jan. 21, 2007, 2 pages.
Skeba, "Best TV Gadgets, Gadgets for the Television 63", Retrieved from: <http://hubpages.com/hub/Best-Tv-Gadgets-Gadgets-for-the-Television> on Dec. 21, 2007, 4 pages.

\* cited by examiner

APPLICATION GADGETS AND ELECTRONIC PROGRAM GUIDES

This application claims priority under 35 U.S.C. Section 120 as a continuation of U.S. patent application Ser. No. 13/190,276, filed Jul. 25, 2011, and titled "Application Gadgets and Electronic Program Guides," which claims priority under 35 U.S.C. Section 120 as a continuation of U.S. patent application Ser. No. 12/060,847, filed Apr. 1, 2008, and titled "Application Gadgets," the entire disclosures each of which are hereby incorporated by reference.

BACKGROUND

Remote control devices were developed to expand an ability of users to control content interaction by associated clients. For example, a client may be configured as a television to consume traditional television programming and a traditional remote control device may be communicatively coupled to the television to initiate one or more control functions of the television. Therefore, a user may press buttons on the traditionally configured remote control device to increase or decrease volume of the television, change channels, select different sources for content, and so on. Traditional remote control devices, however, were static, inflexible and offered limited functionality. Further, while interactivity with a client (e.g., a television) has been available, traditional techniques that were utilized to provide this interactivity were cumbersome and could interrupt the user's experience with the content.

SUMMARY

Application gadget techniques are described. In an implementation, a remote control device includes a display device and one or more modules. The one or more modules are configured to initiate one or more control functions related to control of a display of content by a client. The one or more modules also provide an environment to execute one or more application gadgets such that an output of the one or more application gadgets is displayable on the display device.

In one or more implementations, content that is broadcast by a network operator is output by a client. The content includes a notification that an application gadget is available. An input is received at the client that involves interaction with the notification and that causes installation of the application gadget on another device that is not the client.

In one or more implementations, an input is received which specifies that an application gadget that is installed on a first device is to be copied to a second device. Responsive to the receiving of the input, a copy is formed of the application gadget and one or more configuration settings that were specified by a user of the first device to be communicated to and stored by the second device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Application gadget techniques are described. In an implementation, a remote control device includes a display device that is used to output content. For example, the remote control device may be configured as a "glassy brick" that includes a touch screen that covers approximately half (e.g., more than forty percent) of an outer surface of the remote control device. The display device of the remote control device may be used to output a result of execution of one or more application gadgets. Thus, the remote control device may be used to expand the user's experience with content.

For example, a client may output an electronic program guide which includes an indication (e.g., icon) that an application gadget is available. Selection of the indication may cause the application gadget to be installed on the remote control device. A variety of different application gadgets may be installed on the remote control device. For instance, the application gadget may relate the respective content, such as a dedicated search tool that locates showings of the content via a broadcast and/or from a digital video recorder.

Selection of the notification may also enable the user to select another device to install the application gadget, such as a home personal computer. Continuing with the previous example, selection of the notification may cause a display of other devices that are available for installation of the application gadget, e.g., devices that are available via a local network connection. Further discussion of installation of gadgets on a remote control device and/or another device may be found in relation to FIG. 5.

Techniques are also described to copy application gadgets and configuration settings between devices. Traditionally, application gadgets were installed separately on each device as desired by a user from a common source. However, a user may provide configuration settings to customize an application gadget, such as to specify a favorite sports team. Therefore, the user was forced to provide configuration settings for each installation of the application gadget. Using these techniques, however, configuration settings may be automatically copied with the application gadget between devices as desired by the user, further discussion of which may be found in relation to FIGS. 6 and 7.

In the following discussion, an example environment and systems are first described that is operable to perform techniques involving application gadgets. Example procedures are then described that may be employed in the example environment, as well as in other environments. Although the application gadget techniques are described in a television environment in the following discussion, it should be readily apparent that a wide variety of goods and/or services may also employ these techniques without departing from the spirit and scope thereof.

Example Environment

Figure 1:
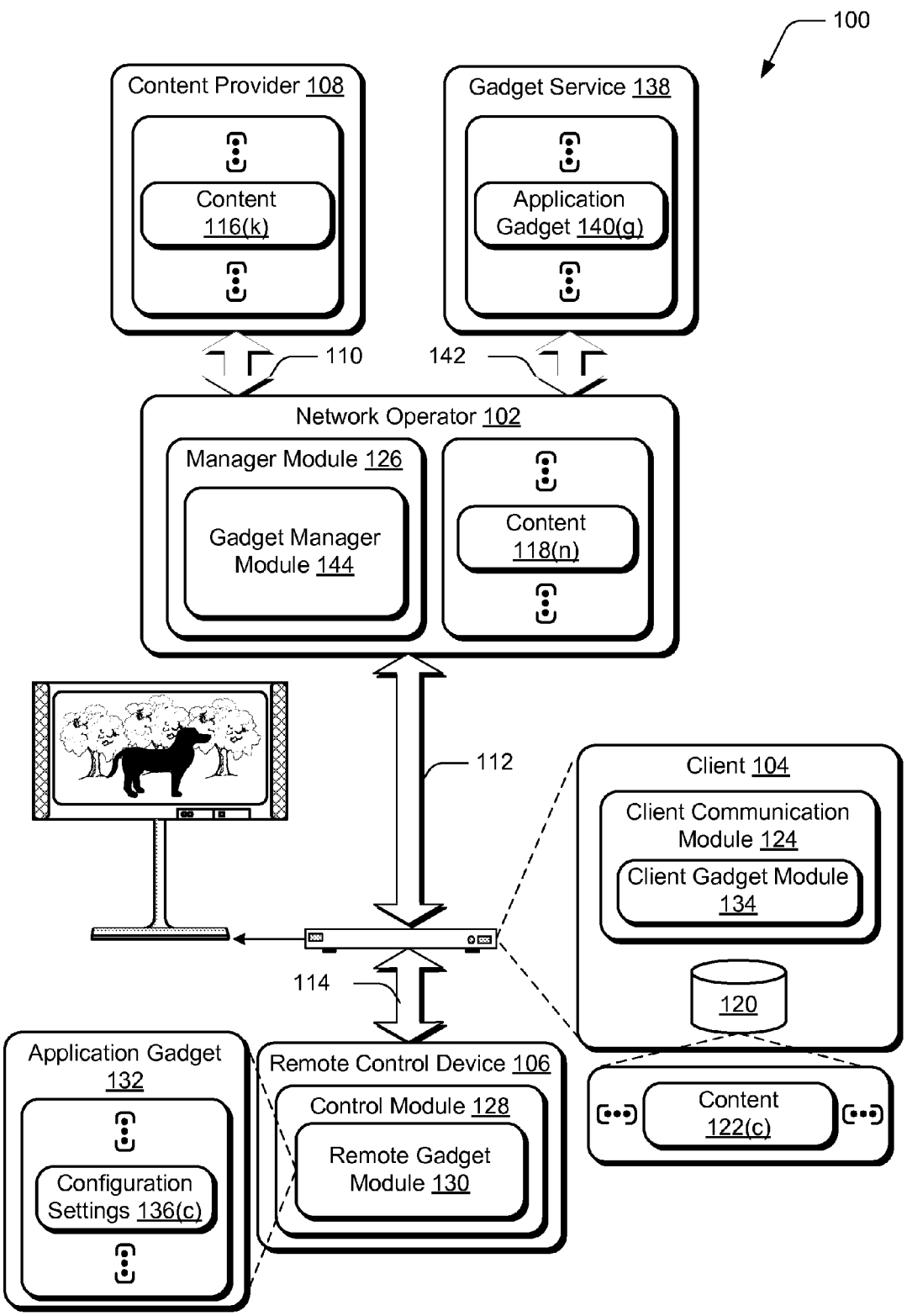
FIG. 1 is an illustration of an environment in an example implementation that is operable to employ application gadget techniques.

FIG. 1 is an illustration of an environment 100 in an example implementation that is operable to employ application gadget techniques. The illustrated environment 100 includes a network operator 102 (e.g., a "head end"), a client 104, a remote control device 106 and a content provider 108 that are communicatively coupled, one to another, via network connections 110, 112, 114. In the following discussion, the network operator 102, the client 104, the remote control device 106 and the content provider 108 may be representative of one or more entities, and therefore by convention reference may be made to a single entity (e.g., the client 104) or multiple entities (e.g., the clients 104, the plurality of clients 104, and so on). Additionally, although a plurality of network connections 110-114 are shown separately, the network connections 110-114 may be representative of network connections achieved using a single network or multiple networks, e.g., network connections 110, 112 may be implemented via the internet and network connection 114 may be implemented via a local network connection, such as via infra red, a radio frequency connection, and so on. In another example, network connection 114 may also be implemented via the internet.

The client 104 may be configured in a variety of ways. For example, the client 104 may be configured as a computer that is capable of communicating over the network connections 112, 114, such as a television, a mobile station, an entertainment appliance (e.g., a game console), a set-top box communicatively coupled to a display device as illustrated, a wireless phone, and so forth. Thus, the client 104 may range from a full resource device with substantial memory and processor resources (e.g., television-enabled personal computers, television recorders equipped with hard disk) to a low-resource device with limited memory and/or processing resources (e.g., traditional set-top boxes).

Communication of content to the client 104 may be performed in a variety of ways. For example, the client 104 may be communicatively coupled to the content provider 108 (which may be representative of one or more content providers) using a packet-switched network, e.g., the Internet. Accordingly, the client 104 may receive one or more items of content 116(k), where "k" can be any integer from 1 to "K" directly from the content provider 108, e.g., via one or more websites. The content 116(k) may include a variety of data, such as television programming, video-on-demand (VOD) files, one or more results of remote application processing, and so on. A variety of other examples are also contemplated, such as by using an indirect distribution example in which the content 116(k) is communicated over the network connection 110 to the network operator 102.

Content 116(k), as illustrated in the example environment 100 of FIG. 1, is communicated via the network connection 110 is received by the network operator 102 and may be stored as one or more items of content 118(n), where "n" can be any integer from "1" to "N". The content 118(n) may be the same as or different from the content 116(k) received from the content provider 108. The content 118(n), for instance, may include additional data for broadcast to the client 104. For example, the content 118(n) may include electronic program guide (EPG) data from an EPG database for broadcast to the client 104 utilizing a carousel file system and an out-of-band (OOB) channel. Distribution from the network operator 102 to the client 104 over network connection 112 may be accommodated in a number of ways, including cable, radio frequency (RF), microwave, digital subscriber line (DSL), and satellite.

The client 104, as previously stated, may be configured in a variety of ways to receive the content 118(n) over the network connection 114. The client 104 typically includes hardware and software to transport and decrypt content 118(n) received from the network operator 102 for output to and rendering by the illustrated display device. Although a display device is shown, a variety of other output devices are also contemplated, such as speakers. Although the display device is illustrated separately from the client 104, it should be readily apparent that the client 104 may also include the display device as an integral part thereof.

The client 104 may also include digital video recorder (DVR) functionality. For instance, the client 104 may include a storage device 120 to record content 118(n) as content 122(c) (where "c" can be any integer from one to "C") received via the network connection 112 for output to and rendering by the display device. The storage device 120 may be configured in a variety of ways, such as a hard disk drive, a removable computer-readable medium (e.g., a writable digital video disc), and so on. Thus, content 122(c) that is stored in the storage device 120 of the client 104 may be copies of the content 118(n) that was streamed from the network operator 102. Additionally, content 122(c) may be obtained from a variety of other sources, such as from a computer-readable medium that is accessed by the client 104, and so on. For example, content 122(c) may be stored on a digital video disc (DVD) when the client 104 is configured to include DVD functionality.

The client 104 includes a client communication module 124 that is representative of functionality of the client 104 to control content interaction on the client 104, such as through the use of one or more "control functions". The control functions may include a variety of functions to control output of content, such as to control volume, change channels, select different inputs, configure surround sound, and so on. The control functions may also provide non-linear playback of the content 122(c) (i.e., time shift the playback of the content 122(c)) such as pause, rewind, fast forward, slow motion playback, and the like. For example, during a pause, the client 104 may continue to record the content 118(n) in the storage device 120 as content 122(c). The client 104, through execution of the client communication module 124, may then playback the content 122(c) from the storage device 120, starting at the point in time the content 122(c) was paused, while continuing to record the currently-broadcast content 118(n) in the storage device 120 from the network operator 102.

When playback of the content 122(c) is requested, the client communication module 124 retrieves the content 122(c). The client communication module 124 may also restore the content 122(c) to the original encoded format as received from the content provider 108. For example, when the content 122(*c*) is recorded on the storage device 120, the content 122(*c*) may be compressed. Therefore, when the client communication module 124 retrieves the content 122(*c*), the content 122(*c*) is decompressed for rendering by the display device.

The network operator 102 is illustrated as including a manager module 126. The manager module 126 is representative of functionality to configure content 118(*n*) for output (e.g., streaming) over the network connection 112 to the client 104. The manager module 126, for instance, may configure content 116(*k*) received from the content provider 108 to be suitable for transmission over the network connection 112, such as to "packetize" the content for distribution over the Internet, configuration for a particular broadcast channel, and so on.

Thus, in the environment 100 of FIG. 1, the content provider 108 may broadcast the content 116(*k*) over a network connection 110 to a multiplicity of network operators, an example of which is illustrated as network operator 102. The network operator 102 may then stream the content 118(*n*) over a network connection 112 to a multitude of clients, an example of which is illustrated as client 104. The client 104 may then store the content 118(*n*) in the storage device 120 as content 122(*c*), such as when the client 104 is configured to include digital video recorder (DVR) functionality, and/or output the content 118(*n*) directly.

The remote control device 106 is illustrated as including a control module 128 that is representative of functionality to control operation of the remote control device 106. The control module 128, for instance, is representative of functionality to initiate control functions of the client 104. For example, the control module 128 may be configured to receive inputs related to selection of representations of control functions, such as a selection of a "volume up" representation on the remote control device 106 using a button. Data representing this selection may then be communicated via network connection 114 to the client 104 that causes the client 104 (e.g., the client communication module 124) to increase the volume. A variety of other control functions may also be initiated by the control function module 128 as previously described.

The control module 128 is also illustrated as including a remote gadget module 130, which is representative of functionality of the remote control device 106 to provide an environment for execution of one or more application gadgets, an example of which is illustrated as application gadget 132. The client 104, and more particularly the client communication module 124, is illustrated as including a client gadget module 134. The client gadget module 134 is also representative of an environment for execution of one or more application gadgets, which in this case is provided by the client 104.

For example, the remote gadget module 130 and/or the client gadget module 134 may be executable to provide a software service that is available to manage execution and display a result of the execution of the application gadget 132. In an implementation, application gadget 132 is a computer program (e.g., a desktop widget) that provides one or more services without requiring separate applications to be launched for each service. Instead, the application gadget 132 is run an environment that manages multiple gadgets, which in this case is illustrated as remote gadget module 130.

The application gadget 132, for instance, may be a software component that runs in a context of a service (e.g., the remote gadget module 130) such that the application gadget 132 is not executable outside of the context. For example, the application gadget 132 may be configured to provide a targeted purpose output (e.g., as a clock, calendar, to correlate newsfeeds, and so on) that relies on underlying functionality of the service to execute.

Figure 7:
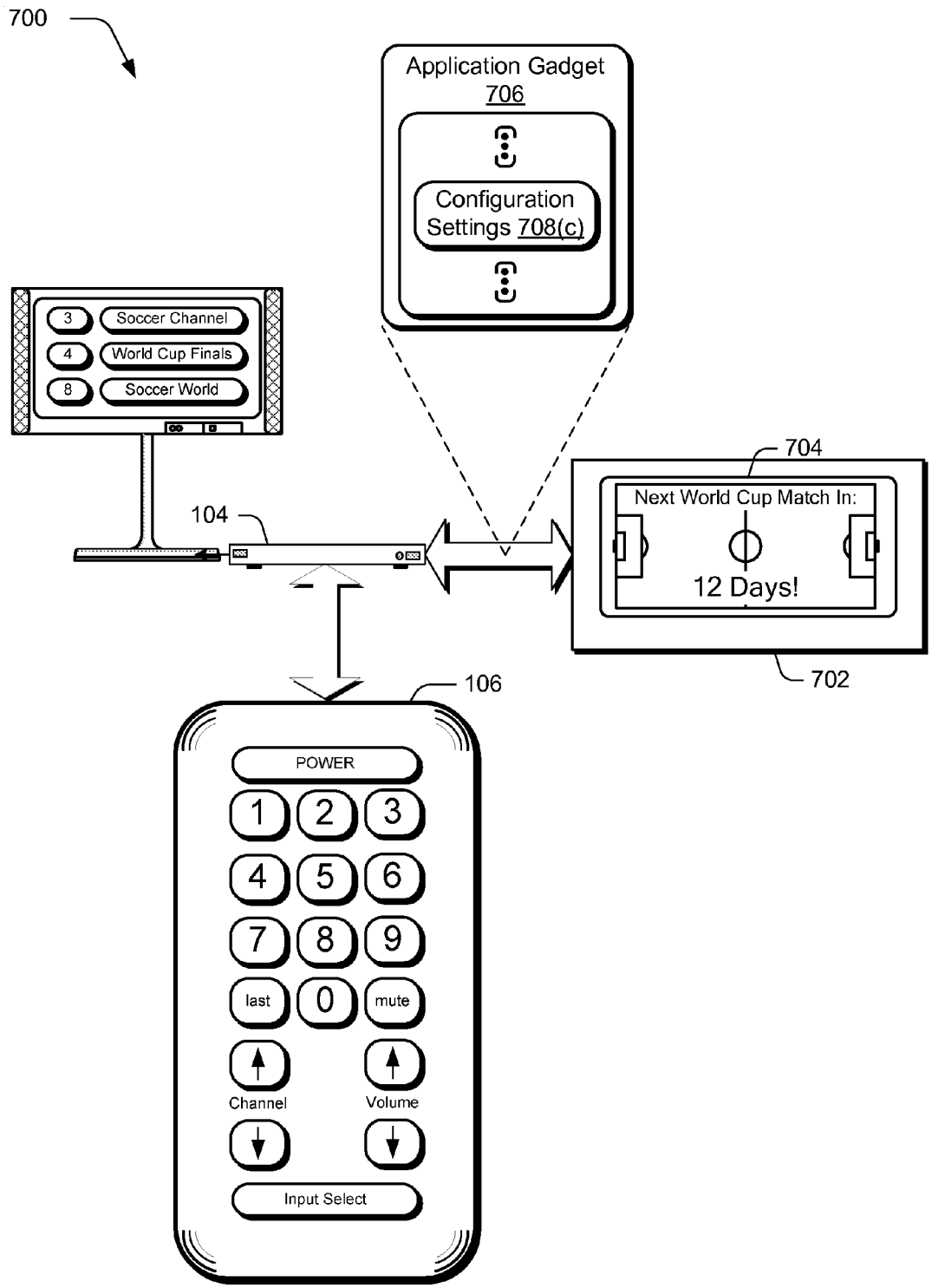
FIG. 7 depicts a system in an example implementation in which interaction with a remote control device causes an application gadget and corresponding configuration settings to be copied from a client to another client.

The output of the application gadget 132, when configured as a desktop gadget, may be displayed on a "desktop" (e.g., a "sidebar") and/or an auxiliary display (an example of which may be found in relation to FIG. 7). The application gadget 132 may also be configured as a web gadget that obtains data via a network connection 114. A variety of other examples are also contemplated.

The illustrated application gadget 132 includes one or more configuration settings 136(*c*), which may be input by a user to customize execution of the gadget. For example, the configuration settings 132(*c*) may be input to specify a particular city to obtain a display of weather for that city, a favorite sports teams, stock symbols, and so on, further discussion of which may be found in relation to FIGS. 6 and 7.

The application gadget 132 may be obtained in a variety of ways. In the illustrated example environment 100, a gadget service 138 includes one or more application gadgets 140(*g*) that are accessible to a network operator 102 via network connection 142. The gadget service 138 may be configured in a variety of ways, such as a stand-alone service that provides the application gadgets 140(*g*) for a fee, a "sharing" service in which the one or more application gadgets 140(*g*) are provided free of charge, and so on.

The network operator 102, and more particularly the manager module 126, is illustrated as including a gadget manager module 144. The gadget manager module 144 is representative of functionality of the network operator 102 to manage distribution of the one or more application gadgets 140(*g*) over the network connection 112 that were obtained from the gadget service 138. For example, the application gadget 140(*g*) may be streamed with content 118(*n*), provided in a stand-alone stream, accessible for download via the Internet, and so on. An output of the execution of the application gadget 132 may then be displayed on a display device of the remote control device 106, further discussion of which may be found beginning in relation to the following figure.

Figure 2:
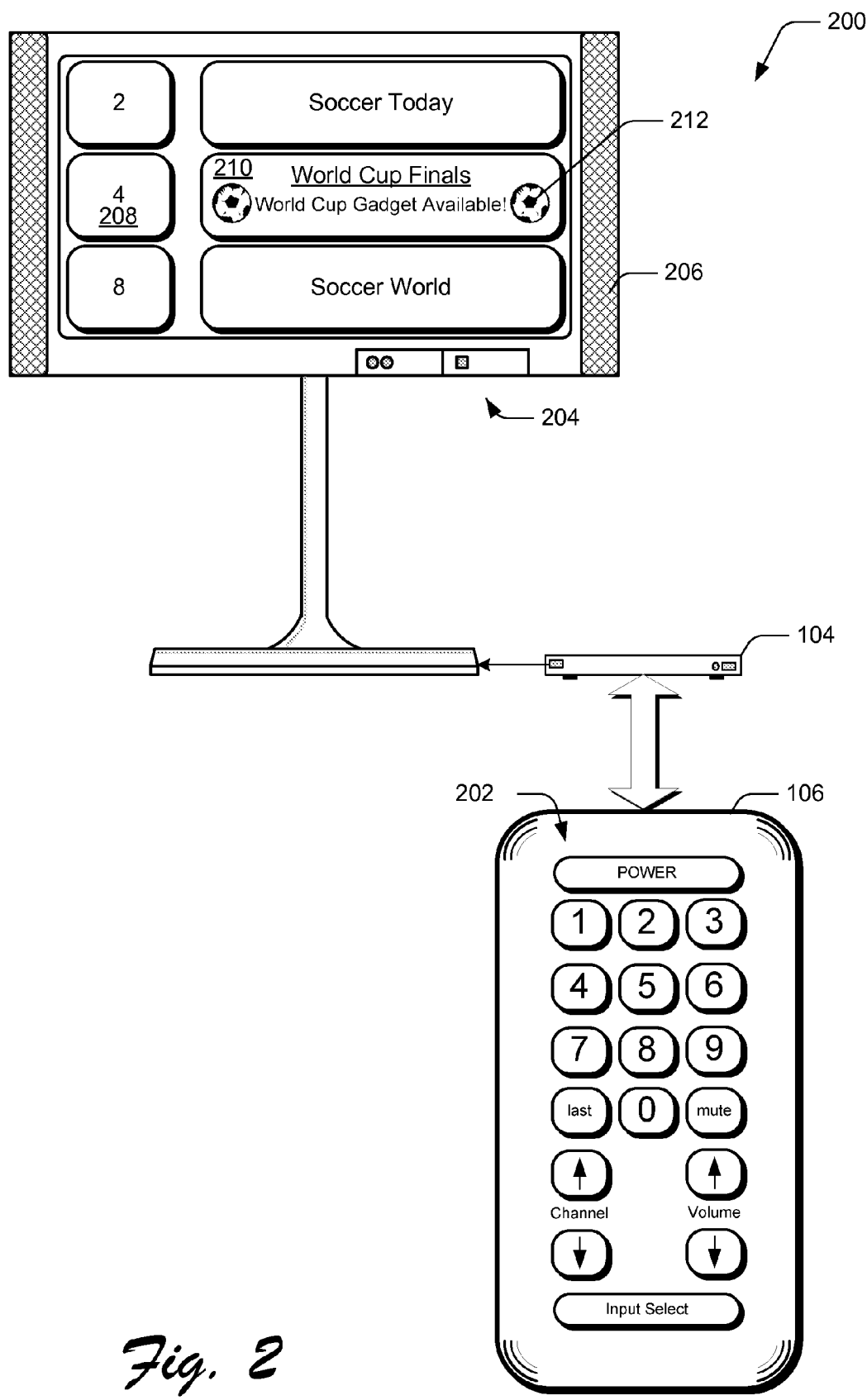
FIG. 2 depicts an exemplary system showing a remote control device of FIG. 1 in greater detail as displaying representations of one or more control functions of a client that may be initiated through selection on the remote control device.

FIG. 2 depicts an exemplary system 200 showing the remote control device 106 in greater detail as displaying representations 202 of one or more control functions of the client 104 that may be initiated through selection on the remote control device 106. The illustrated remote control device 106 includes a display device (e.g., a touch screen) that consumes approximately half of an outer surface of the remote control device thereby giving the remote control device an appearance of a "glass brick".

In another implementation, the display device of the remote control device 104 covers at least forty percent of the outer surface of the remote control device 104. In a further implementation, the display device consumes, approximately, an outer surface of the remote control device 106 that is viewable by a user when placed on a surface (e.g., a top of a table) and/or grasped in a hand of the user, e.g., the illustrated outer surface of the remote control device 106 in FIG. 2. A variety of other implementations are also contemplated, such as implementations in which the display device of the remote control device 106 includes more or less than the previously described amounts of the outer surface of the remote control device 106.

The display device of the remote control device, for instance, may be implemented such that representations of control functions and other data are reconfigurable and therefore may be displayed on the remote control device 106 in a variety of ways. For example, different portions of the display device of the remote control device 106 may be configured to detect contact and/or proximity of an object to the display device such that different portions of the display device are selectable. A variety of different techniques may be used to detect selection, such as through resistive techniques, surface acoustic waves, capacitive, infrared, use of strain gauges, optical imaging, dispersive signal technology, acoustic pulse recognition, frustrated total internal reflection, and so on. Using these techniques, a variety of data may be displayed on the display device of the remote control device. Further, interaction with the displayed data may be performed in a variety of ways.

By selecting one or more of the representations 202 using the display device, for instance, a user may supply an input to initiate the represented control function by the client 104. As illustrated by the remote control device 106 of FIG. 2, for instance, a user may select a "power" representation, one or more numbers to select a channel, "mute", "last", "channel up", "channel down", "volume up", "volume down" and "input select". Thus, when the illustrated remote control device 106 is in the control function mode, the remote control device 106 may communicate with the client 104 to control output of content by the client 104.

A client 104 is illustrated as providing an output of an electronic program guide 204 for display on a display device 206. Electronic program guide 204 includes representations of channels and corresponding content available via those channels. For example, the illustrated electronic program guide 204 includes a representation 208 of channel "4" and a representation 210 of a corresponding television program "World Cup Finals". The representation 210 includes a notification 212 that an application gadget is available, which is illustrated as including text "World Cup Gadget Available" and a corresponding icon of a soccer ball. The text and/or the icon are selectable to cause installation the represented application gadget, an example of which is illustrated in the following figure.

Figure 3:
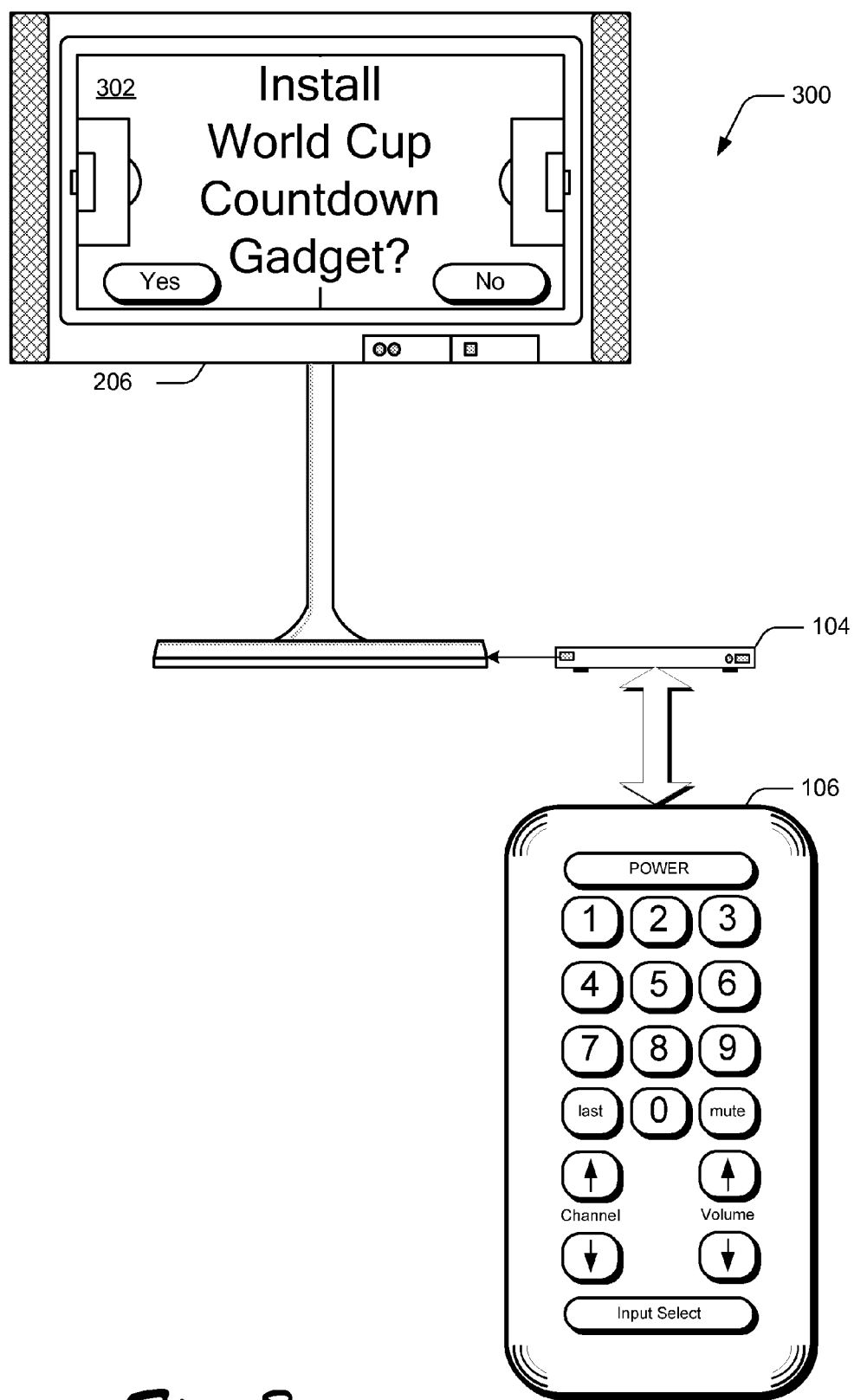
FIG. 3 illustrates an example system in which a verification screen is output to verify that installation is desired of the application gadget represented by a notification of FIG. 2.

FIG. 3 illustrates an example system 300 in which a verification screen 302 is output to verify that installation is desired of the application gadget represented by the notification 212 of FIG. 2. The verification screen 302 includes text which queries whether the user wants to "Install World Cup Countdown Gadget?" If so, the user may select the "yes" button and if not the "no" button. Selection of the "yes" button may then cause the World Cup countdown gadget to be installed in the remote control device 106, a result of which may be found in relation to the following figure.

Figure 4:
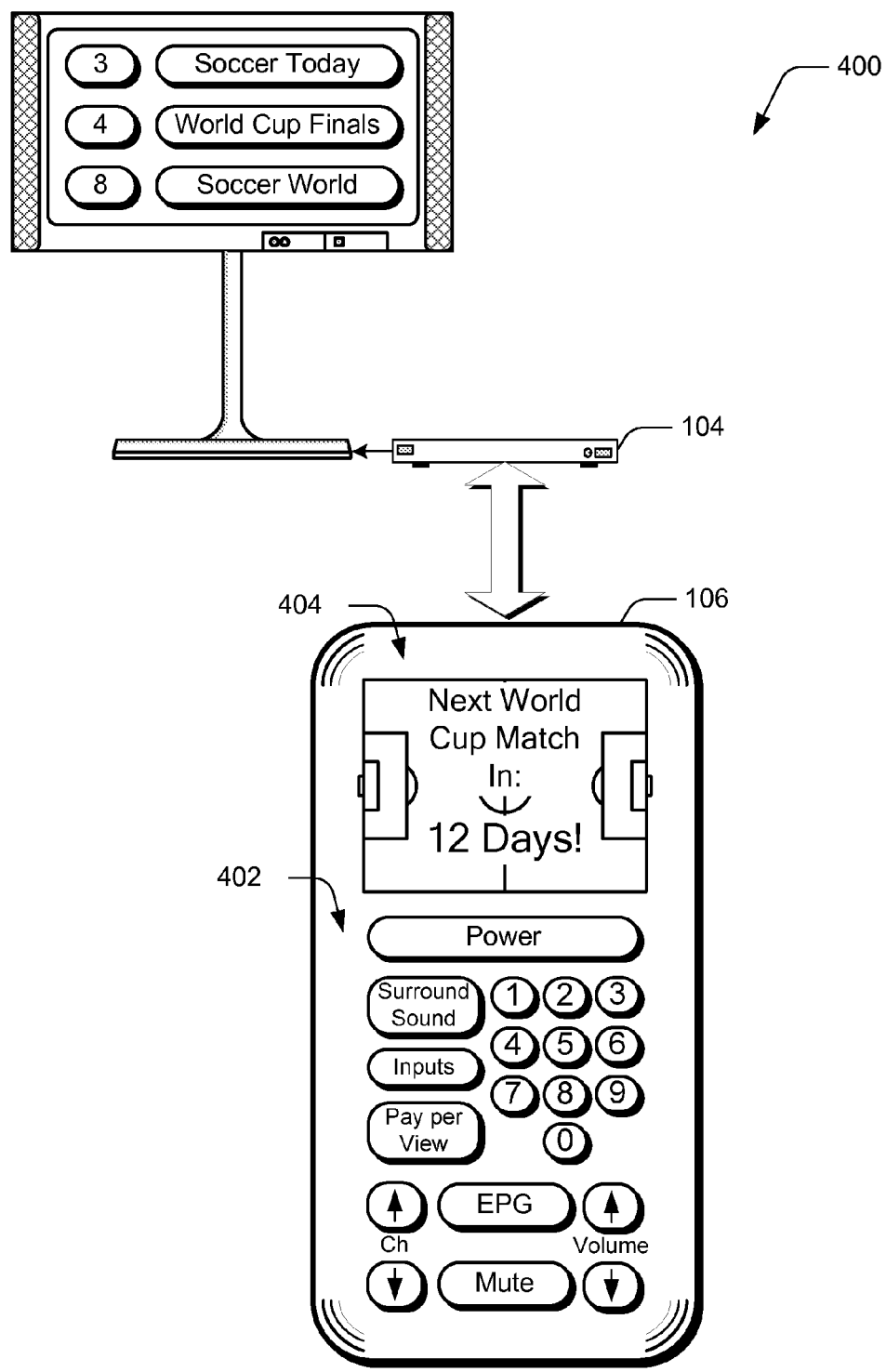
FIG. 4 depicts a system in an example implementation in which an application gadget of FIG. 3 is installed and executed on a remote control device.

FIG. 4 depicts a system 400 in an example implementation in which the World Cup countdown gadget of FIG. 3 is installed and executed on the remote control device 106. The remote control device 106 includes a plurality of representations 402. For example, the representations 402 include a representation for "power", representations that form a numeric keypad, "channel up" and "channel down" representations and "volume up" and "volume down" representations that correspond to the representations 202 of the remote control device 106 of FIG. 2.

However, the size and arrangement of those representations, one to another, has changed to enable the remote control device to include an output 404 of the World Cup countdown gadget. For example, the size and shape of the representations 402 of the numeric keypad of the remote control device 106 of FIG. 4 has been changed when compared with the representations of the numeric keypad of the remote control device 106 of FIG. 2. A similar change may also be noticed when comparing the respective representations of the power control function of FIGS. 2 and 3.

Additionally, the arrangement of the representations of the control functions has been changed. For instance, the representations of the numeric keypad as well as the representations to change the channel and the volume have been positioned lower on the display device of the remote control device 106 of FIG. 4 when compared with the remote control device 106 of FIG. 2. Further, different control functions are represented by the remote control device 106 of FIG. 4 when compared with a remote control device of FIG. 2. The rearrangement and repositioning of the representations 402 may thus be used to allocate a portion of the display device of the remote control device 106 for output 404 of the World Cup countdown gadget.

The output 404 of the World Cup countdown gadget includes the text "Next World Cup Match In: 12 days!" In this way, the display device of the remote control device 106 may further expand content interaction on the part of the user. Although a countdown to content output has been described, functionality provided by the application gadget executed on the remote control device 106 may take a variety of forms.

For example, the application gadget executed on the remote control device 106 may relate to output of television programs that are broadcast by the network operator 102. For instance, the application gadget may be executable to identify one or more television programs that are currently available for output by the client 104, to search a webpage having electronic program guide listings of content that is recorded on the client 104 (e.g., content 122(c) that is stored storage 120), provide a list of top rated content that is obtained via a network connection, and so on. A variety of other examples are also contemplated, further discussion of which may be found in relation to the following procedures.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the application gadget techniques are platform-independent, meaning that the techniques may be implemented on a variety of commercial computing platforms having a variety of processors.

Example Procedures

The following discussion describes application gadget techniques that may be implemented utilizing the previously described environment, systems, user interfaces and devices. Aspects of each of the procedures may be implemented in hardware, firmware, software or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and systems 200-400 of FIGS. 2-4, respectively.

Figure 5:
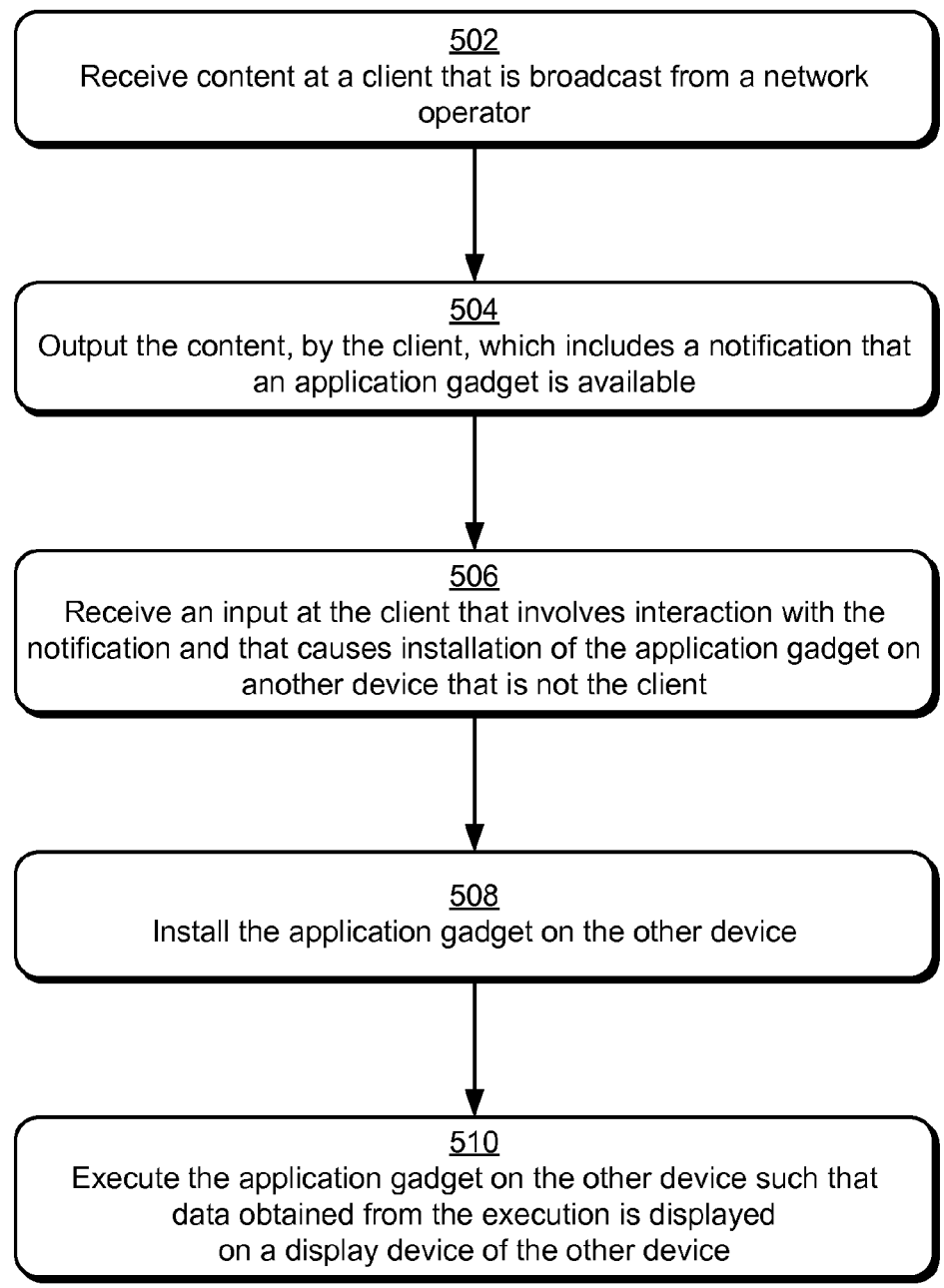
FIG. 5 is a flow diagram depicting a procedure in an example implementation in which content that is output by a client includes a notification that an application gadget is available for installation.

FIG. 5 depicts a procedure 500 in an example implementation in which content that is output by a client includes a notification that an application gadget is available for installation. Content is received at a client that is broadcast from a network operator (block 502). For example, a client 104 may receive a stream of content 118(n) (e.g., television programs and supporting content such as an electronic program guide and advertisements) via a network connection 112.

The content is output, by the client, which includes a notification that an application gadget is available (block 504). For example, the content may be configured as an electronic program guide that includes a notification 212 that an application gadget is available. A variety of other examples are also contemplated, such as display of an icon or other notification during a television program, display of a notification in a "ticker" that is scrolled across a display device of the client 104, and so on.

An input is received at the client that involves interaction with a notification and that causes installation of the application gadget on another device that is not the client (block 506). Continuing with the previous example, a user may interact with the remote control device 106 to cause the application gadget that corresponds to the notification 212 to be installed on the remote control device 106. The application gadget may also be installed on a variety of other devices, an example of which may be found in relation to FIGS. 6 and 7.

Responsive to the receipt of the input, the application gadget is installed on the other device (block 508). For example, the remote gadget module 130 may cause the client 104 to download the application gadget 140(g) via the network operator 102. In another example, the application gadget 140(g) may be streamed with the content 118(n) by the network operator 102. A variety of other examples are also contemplated, such as a direct download by the remote control device 106 that does not involve the client 104 and/or the network operator 102.

The application gadget is executed on the other device such that data obtained from the execution is displayed on a display device of the other device (block 510). As previously described, the application gadget 132 may be executed within the environment provided by the remote gadget module 132 to output a variety of data on a display device of the remote control device 106.

A variety of different application gadgets may be executed on the remote control device 106. For example, the remote control device 106 may execute application gadget 132 that causes the remote control device 106 to interact with a website. Thus, this application gadget functions as a widget, which is a downloadable interactive tool that is configured to download data over a network connection for output on the remote control device 106. For instance, the application gadget may be executable to identify one or more television programs that are currently available for output by the client 104, to search a webpage of electronic program guide listings and/or content that is recorded on the client 104 (e.g., content 122(c) that is stored storage 120), provide a list of top rated content that is obtained via in network connection, and so on. An application gadget may also be configured as a sideshow gadget that is executable to provide an output on an auxiliary external display, further discussion of which may be found in relation to the following figures.

Figure 6:
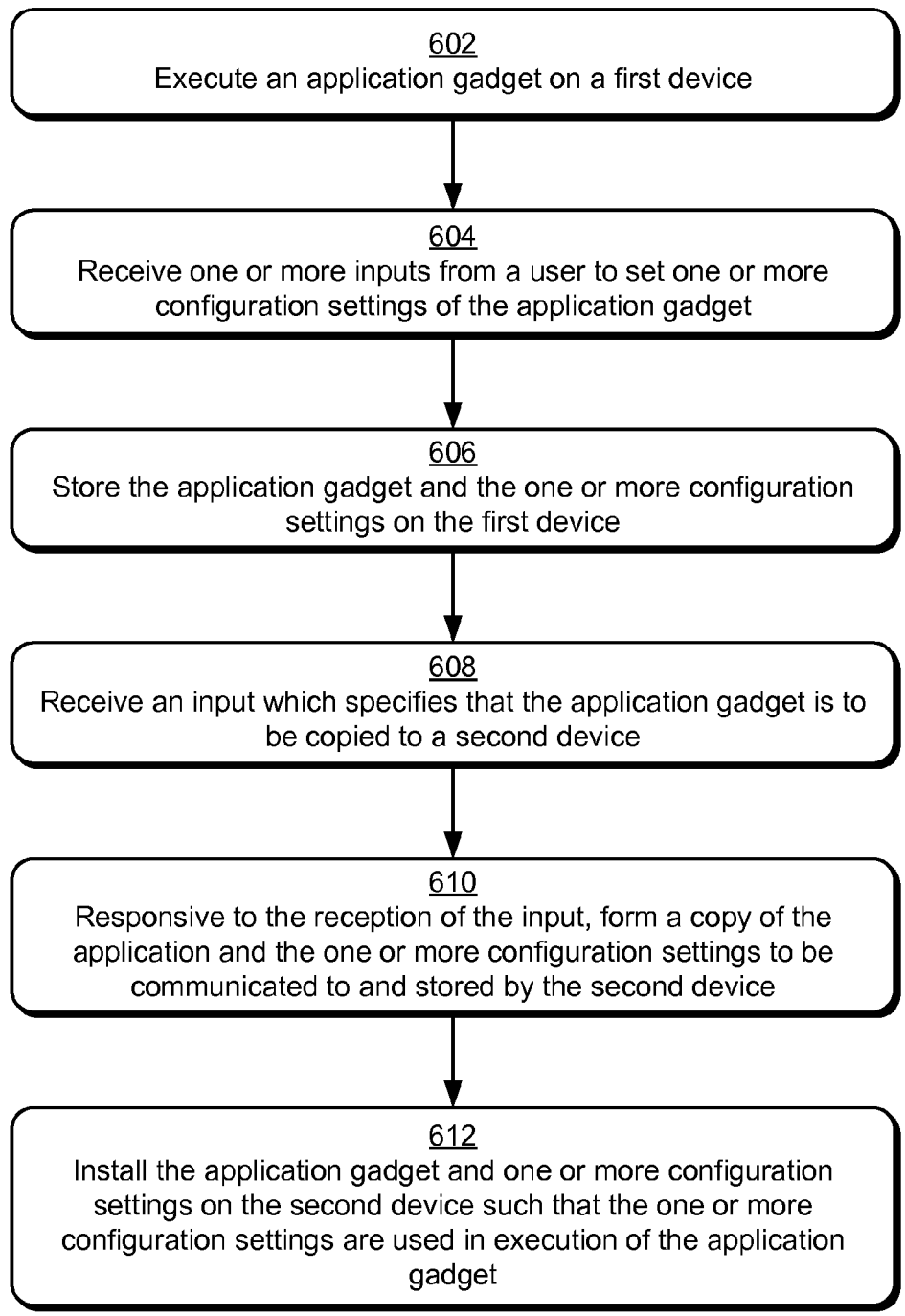
FIG. 6 is a flow diagram depicting a procedure in an example implementation in which an application gadget and corresponding configuration settings are copied from a first device to second device.

FIG. 6 depicts a procedure 600 in which an application gadget and corresponding configuration settings are copied from a first device to a second device. An application gadget is executed on the first device (block 602) and one or more inputs are received from a user to set one or more configuration settings of the application gadget (block 604). For example, the configuration settings 136(c) may specify a particular city from which a weather forecast is to be received, a favorite sports team, a network address for a calendar, and so on. The application gadget and the one or more configuration settings are then stored on the first device (block 606).

An input is received which specifies that the application gadget is to be copied to a second device (block 608). For example, a user of the remote control device 106 may specify that the application gadget 132 is to be copied to the client 104 for execution within the environment provided by the client gadget module 134. In another example, interaction with a first device is utilized to control copying of an application gadget between other devices, further discussion of which may be found in relation to the following figure.

FIG. 7 depicts a system 700 in an example implementation in which interaction with a remote control device causes an application gadget and corresponding configuration settings to be copied from a client to another client. The system 700 includes the remote control device 106 and the client 104 of FIG. 1. The system 700 also includes another client 702 which is illustrated as being configured as a laptop computer that has an auxiliary display device 704.

An application gadget 706, including one or more configuration setting 708(c) (where "c" can be an integer between one and "C"), is illustrated as being copied from the client 104 to the other client 702. The application gadget 706 may then be executed automatically and without further user intervention in a manner consistent with how the application gadget was executed on the client 104.

Returning now to FIG. 6, responsive to the reception of the input which which specifies that the application gadget is to be copied to the second device, a copy is formed of the application and the one or more configuration settings to be communicated to and stored by the second device (block 610). Continuing with the previous example, the client gadget module 134 may output a user interface which includes a list of each other device that is accessible over a local area network, wide area network or so on. A user may interact with the user interface to specify which device is to receive a copy of the application gadget 706. The client gadget module 134 may then form the copy of the application gadget 706 and the one or more configuration settings 708(c) for communication over a network connection to the other client 702. A wide variety of other examples are also contemplated.

The application gadget and one or more configuration settings are then installed on the second device such that the one or more configuration settings are used in execution of the application gadget (block 612). For example, the application gadget may be configured to output locations of favorite television programs of a user, and the configuration settings may specify those television programs. Therefore, by copying the configuration settings with the application gadget, the application gadget may automatically and without further user intervention function as originally configured on the first device, e.g., the client 104. In this way, functionality of the application gadget to be distributed to devices as desired by a user without performing a manual setup of the application gadget on each of the devices.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A client device comprising one or more modules implemented at least partially in hardware and configured to:
receive at a client device an input that involves interaction with a notification that is output in association with an electronic program guide (EPG) that is broadcast by a network operator, the notification indicating that an application gadget is available;

responsive to the input, display one or more options by the client device that are selectable to specify another computing device that is to receive and install the application gadget for execution on the other computing device, the one or more options including a remote control device that is associated with the client device to initiate one or more control functions of the client device; and responsive to selection of the remote control device from the one or more options, initiate communication of the application gadget for installation and display at the remote control device effective to cause a display of one or more representations of the one or more control functions of the client device to be modified to allocate a portion of a display device associated with the remote control device for output of the application gadget.

2. A client device as described in claim 1, wherein the application gadget is configured to provide a targeted purpose output that runs in a context of a service and relies on underlying functionality of the service to execute.

3. A client device as described in claim 1, wherein the application gadget is a software component that runs in a context of a service such that the application gadget is not executable outside of the context.

4. A client device as described in claim 1, wherein the application gadget is configured as a widget that is a downloadable interactive tool that is configured to download data over a network connection for output on the other computing device.

5. A client device as described in claim 1, wherein the notification relates to one or more television programs represented within the electronic program guide.

6. One or more computer readable storage memory having computer readable instructions stored thereon that, responsive to execution by a remote control device, cause the remote control device perform operations comprising:

causing a first input to be transmitted to a client device to select a notification displayed as part of an electronic program guide (EPG) that is broadcast by a network operator, the notification indicating that an application gadget is available;

causing a second input to be transmitted to the client device to select an option to specify which of a plurality of computing devices is to receive and install the application gadget, the option selected from a list of other computing devices including the remote control device, the remote control device being associated with the client device to initiate one or more control functions of the client device responsive to interaction with one or more representations of the one or more control functions of the client device that are displayed on a display device of the remote control device; and responsive to the remote control device being specified as the computing device that is to receive and install the application gadget, modifying a display of the one or more representations to allocate a portion of the display device of the remote control device for output of the application gadget.

7. One or more computer readable storage memory as described in claim 6, wherein the application gadget relates to output of television programs that are broadcast by the network operator.

8. One or more computer readable storage memory as described in claim 6, wherein the application gadget is configured to provide a targeted purpose output that runs in a context of a service and relies on underlying functionality of the service to execute.

9. One or more computer readable storage memory as described in claim 6, wherein the one or more control functions are configured to control one or more of a volume, a channel selection, playback of content, or power at the client device.

10. One or more computer readable storage memory as described in claim 6, wherein the application gadget is executable to:

identify one or more television programs that are currently available for output by the client device;

search a webpage of electronic program guide listings and content that is recorded on the client device; or provide a list of top-rated content, the list being accessible to the client device via a network connection.

11. One or more computer readable storage memory as described in claim 6, wherein the application gadget is a software component that runs in the context of the service such that the application gadget is not executable outside of the context.

12. A method comprising:

providing one or more options to be displayed on a client device, wherein the one or more options are selectable to specify another computing device that is to receive and install an application gadget for execution on the other computing device, the one or more options including a remote control device that is associated with the client device to initiate one or more control functions of the client device; and receiving a request for the application gadget to be communicated to the remote control device that is configured to initiate one or more control functions of the client device, the request specifying the remote control device based on an input that was initiated through selection of an option output by the client device responsive to selection of a notification in an electronic program guide (EPG) displayed by the client device; and communicating the application gadget via a network for installation and execution by the remote control device, the application gadget being communicated to the remote control device effective to cause the remote control device to modify a display of one or more representations of the one or more control functions of the client device to allocate a portion of a display device associated with the remote control device for output of the application gadget.

13. A method as described in claim 12, wherein the application gadget is a software component that runs in the context of the service such that the application gadget is not executable outside of the context.

14. A method as described in claim 12, wherein the application gadget comprises a program configured to provide one or more services without requiring separate applications to be launched for each service.

15. A method as described in claim 14, wherein the one or more representations of the one or more control functions of the client device are modified by at least rearranging the one or more representations on the display device associated with the remote control device.

16. A method as described in claim 12, wherein the one or more representations of the one or more control functions of the client device are modified by at least resizing the one or more representations on the display device associated with the remote control device.

17. A method as described in claim 12, wherein the one or more representations of the one or more control functions of the client device that are displayed at the display device of the remote control device are modified in at least one of size or position.

18. A method as described in claim 12, wherein the application gadget is executable to:
identify one or more television programs that are currently available for output by the client device;
search a webpage of electronic program guide listings and content that is recorded on the client device; or
provide a list of top-rated content, the list being accessible to the client device via a network connection.

19. A method as described in claim 12, wherein the one or more control functions of the client device are configured to control output of content at the client device by at least controlling one or more of a volume, a channel selection, playback of the content, or power at the client device.

20. A method as described in claim 12, wherein the application gadget is configured to provide a targeted purpose output that is configured to run in a context of a service and rely on underlying functionality of the service to execute.

* * * * *